(12) United States Patent
Mezer et al.

(10) Patent No.: US 8,130,939 B2
(45) Date of Patent: Mar. 6, 2012

(54) MAINTAINING CONVERGENCE OF A RECEIVER DURING CHANGING CONDITIONS

(75) Inventors: Amir Mezer, Haifa (IL); Adee Ran, Maayan Baruch (IL); Ehud Shoor, Haifa (IL); Harry Birenboim, Haifa (IL); Yaniv Hadar, Yehuda (IL); Assaf Benhamou, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1376 days.

(21) Appl. No.: 11/731,232

(22) Filed: Mar. 30, 2007

(65) Prior Publication Data

US 2008/0240412 A1    Oct. 2, 2008

(51) Int. Cl.
*H04M 9/00*    (2006.01)
(52) U.S. Cl. ............................. 379/390.03; 379/388.03
(58) Field of Classification Search ............... 379/406.01–406.16, 388, 388.01, 379/389, 391, 229, 233, 284, 285, 350, 3, 379/388.03, 390.01, 390.03–395.01; 381/71.1, 381/71.11, 103, 107; 375/219, 220, 221, 375/222, 231
See application file for complete search history.

(56) References Cited

U.S. PATENT DOCUMENTS

| | | | | |
|---|---|---|---|---|
| 6,792,040 | B1* | 9/2004 | Davis et al. | 375/222 |
| 7,243,065 | B2* | 7/2007 | Stephens et al. | 704/226 |
| 7,254,198 | B1* | 8/2007 | Manickam et al. | 375/348 |
| 7,646,807 | B1* | 1/2010 | Manickam et al. | 375/232 |
| 7,664,172 | B1* | 2/2010 | Manickam et al. | 375/232 |
| 2003/0086486 | A1* | 5/2003 | Graziano et al. | 375/222 |

OTHER PUBLICATIONS

U.S. Appl. No. 11/394,925, filed Mar. 31, 2006, entitled, "Techniques to Converge and Adapt a Communication System Receiver," by Amir Mezer, et al.

* cited by examiner

*Primary Examiner* — Md S Elahee
*Assistant Examiner* — Akelaw Teshale
(74) *Attorney, Agent, or Firm* — Trop, Pruner & Hu, P.C.

(57) ABSTRACT

In one embodiment, the present invention includes an apparatus having an automatic gain control (AGC) stage to receive an input signal from a communication channel physical medium, a first local gain stage coupled to an output of the AGC stage, an equalizer coupled to an output of the first local gain stage, an echo canceller to receive local data to be transmitted along the communication channel physical medium, and a second local gain stage coupled to an output of the echo canceller. Other embodiments are described and claimed.

21 Claims, 3 Drawing Sheets

MAINTAINING CONVERGENCE OF A RECEIVER DURING CHANGING CONDITIONS

BACKGROUND

High speed communication systems capable of higher throughput data rates are emerging. Gigabit Ethernet networks may communicate information at 1 gigabits-per-second (Gbps) or higher over high speed channels. Different Ethernet protocols exist such as those as defined by the Institute of Electrical and Electronics Engineers (IEEE) 802.3 series of standards. For example, a recent protocol is the IEEE Proposed Standard 802.3an titled "IEEE Standard For Information Technology—Telecommunications and information exchange between systems—Local and metropolitan networks—Specific requirements Part 3: Carrier Sense Multiple Access with Collision Detection (CSMA/CD) Access Method and Physical Layer Specifications: Amendment: Physical Layer and Management Parameters for 10 Gb/s Type 10GBASE-T," Draft Amendment P802.3an/Draft 3.1, 2005 ("10GBASE-T Specification"). In addition to Ethernet communication, other communication systems that operate in full duplex mode include digital subscriber lines (DSL) such as asynchronous DSL (ADSL).

These high speed channel, typically realize a corresponding decrease in signal to noise ratio, which might cause higher error rates. Techniques such as forward error correction may be used to decrease the error rates. Such techniques, however, may require a communication system to communicate additional overhead in the form of error correcting information and include additional components. Further, these protocols have certain schemes to control transmission of signals at desired power levels, in efforts to reduce power consumption. However, changing power levels can cause various components to lose convergence and require retraining. For example, a power backoff (PBO) scheme may be used to cause transmit power changes, however, a receiver may be unable to maintain certain mechanisms converged and thus retraining is required under new conditions, although limited timeframes may exist for such retraining.

DETAILED DESCRIPTION

In various embodiments, improved convergence maintenance for a receiver operating according to a given communication protocol such as an Ethernet protocol may be realized by providing an architecture to maintain convergence of various receiver mechanisms such as equalizers, echo cancellers and so forth, during startup and other procedures in which operating conditions change, enabling a shorter and more predictable convergence time for the receiver.

Figure 1:
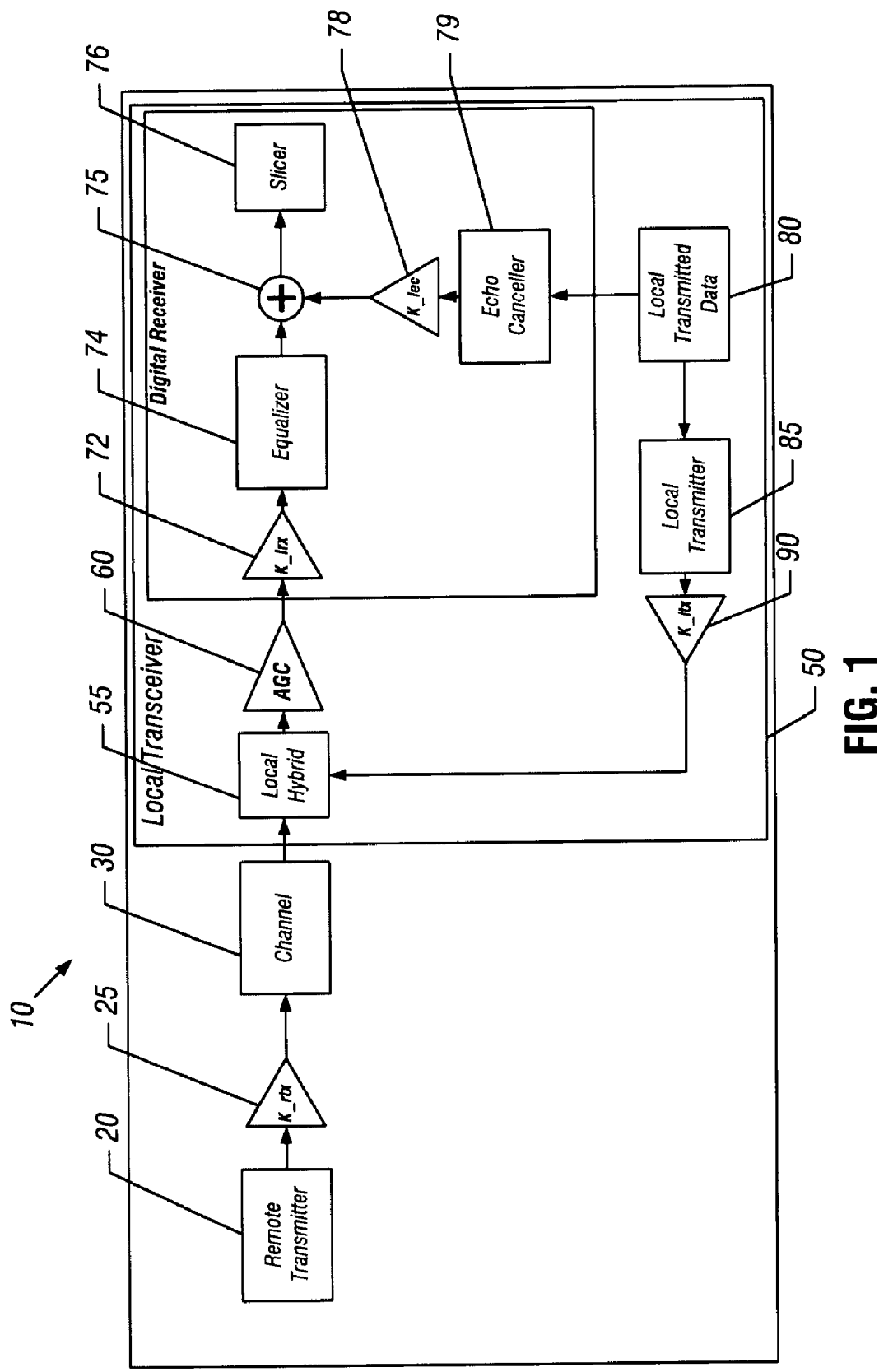
FIG. 1 is a block diagram of a portion in a system in accordance with an embodiment of the present invention.

Referring now to FIG. 1, shown is a block diagram of a portion in a system in accordance with an embodiment of the present invention. As shown in FIG. 1, system 10 may be a portion of a communication system in which a first system that includes a network interface having a transmitter 20 is coupled through a communication channel 30 to a second system including a network interface having a local transceiver 50. Transmitter 20 may be a transmitter of a physical (PHY) unit that in turn is coupled to a media access control (MAC) unit of the first system (not shown in FIG. 1). Note also that transmitter 20 may be a part of a transceiver that also has receive functions. As shown in FIG. 1, a gain stage 25 having a gain of K_rtx may be coupled between transmitter 20 and channel 30. In various embodiments, channel 30 may be a physical medium that may be, for example, a standard cable such as a Category-6 twisted-pair cable used for Ethernet communication.

Similarly, transceiver 50 may be a portion of a PHY unit of the second system. These network interfaces of the first and second systems may represent any network interface suitable for use with a number of different Ethernet techniques such as an IEEE 802.3an protocol or other digital communication protocol such as an ADSL protocol, although the scope of the present invention is not limited in this regard. During communication between these systems, various channel impairments such as near-end and far-end echo and cross-talk may occur, as well as other channel impairments such as signal attenuation or others due to characteristics of the physical medium.

Figure 2:
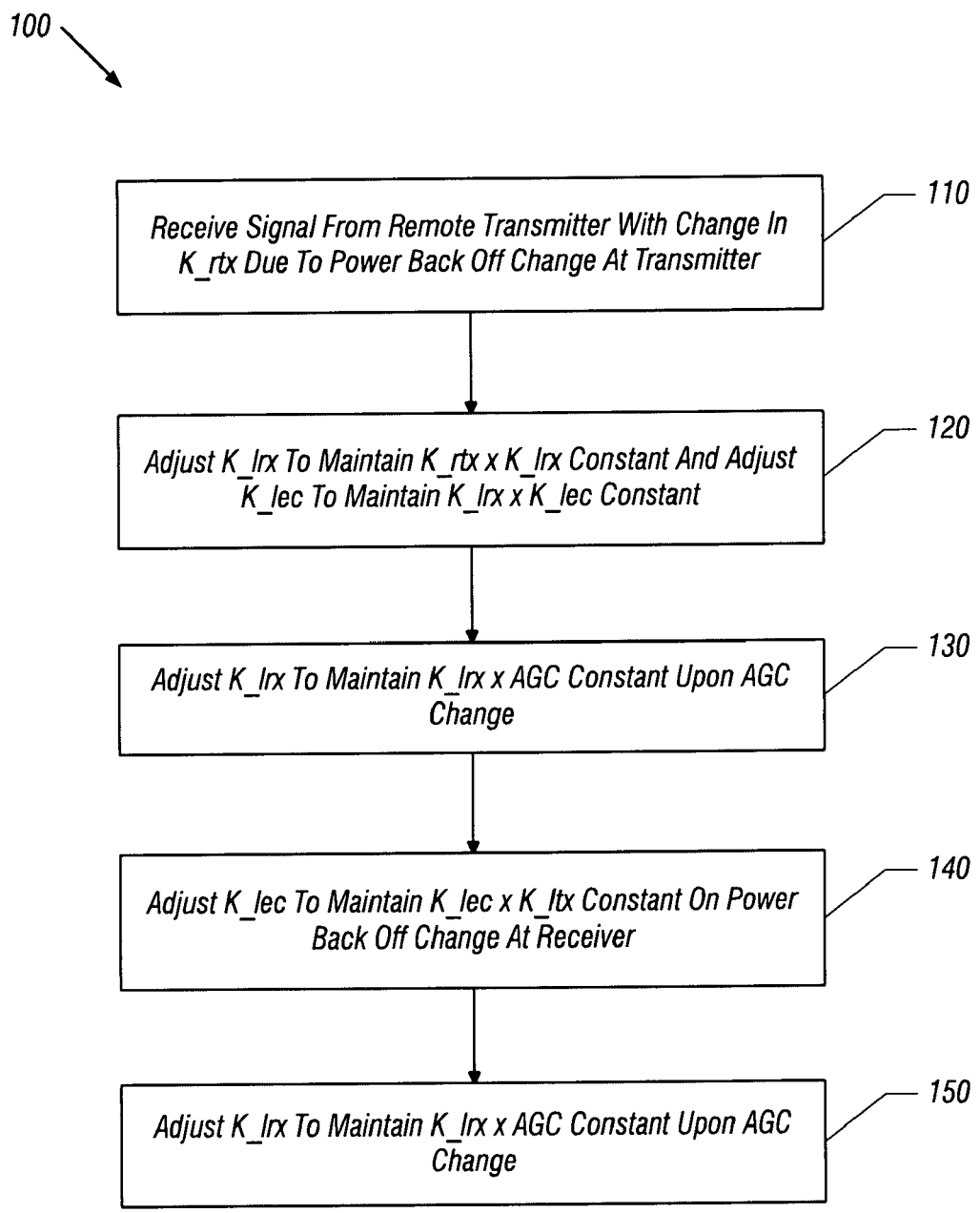
FIG. 2 is a flow diagram of a method in accordance with an embodiment of the present invention.

As shown in FIG. 1, transceiver 50 may include a local hybrid 55 that is coupled to receive incoming signals from channel 30, as well as local transmitted signals from a transmit path of transceiver 50. Hybrid 55 thus enables transmitting and receiving on the same physical medium (e.g., twisted pair) and providing a "received signal" output with a low portion of the "transmitted signal" power. The signals output from local hybrid 55 may be provided to an automatic gain control amplifier stage (AGC stage) 60, which may perform gain control in accordance with an AGC algorithm and provide a compensated input signal to a digital receiver 70. As shown in FIG. 2, digital receiver 70 includes an input gain stage 72 having a gain value of K_lrx, i.e., a gain of the local receiver. The output of gain stage 72 may be provided to an equalizer 74. Equalizer 74 may be, for example, a high pass filter (HPF) such as a finite impulse response (FIR) filter to perform adaptive feed forward equalization (FFE) in order to remove or reduce inter-symbol interference (ISI).

Still referring to FIG. 1, the output of equalizer 74 may be coupled to a summer 75 which sums the equalized signal with an output of a second gain stage 78 having a gain of K_lec, i.e., gain of a local echo canceller. Summer 75 includes a first input coupled to the output of equalizer 74 and a second input coupled to the output of second gain stage 78, and acts to sum the input signals to provide an output signal to a slicer 76. Slicer 76 may generate a decision symbol and a slicer error signal as outputs therefrom. A decision signal may reflect a filtered and/or equalized version of the equalized input signal and may include data to be recovered from the signal received from channel 30. In turn, the error signal may be an error signal to indicate a deviation of the equalizer input signal from a predetermined signal profile for the received input signal. While not shown in the embodiment of FIG. 1, it is to be understood that both of these output signals from digital receiver 70 may be provided to further signal processing circuitry, such as decoding, framing or other circuitry, and on to a MAC unit, for example.

Referring still to FIG. 1, digital receiver 70 further includes an echo canceller 79 that is coupled to receive an output of locally transmitted data 80. Echo canceller 79 may thus operate to cancel echo interference from locally transmitted data 80. As also shown in FIG. 1, locally transmitted data 80 may pass through a local transmitter 85, which may be a transmit portion of transceiver 80. This output signal is then amplified in a transmit gain stage 90, which may have a gain of K_ltx, i.e., corresponding to a gain of the local transmitter, to provide an output signal to local hybrid 55. While shown with this particular implementation in the embodiment of FIG. 1, the scope of the present invention is not limited in this regard.

In various embodiments, first gain stage 72 and second gain stage 78 may be used to compensate for changing operating conditions. That is, the change in transmission gain stages, i.e., gain stage 25 of the first system and transmit gain stage 90 of local transceiver 50, as well as the gain of AGC stage 60, may be compensated using gain stages 72 and 78. In this way, seamless continuous operation of equalizer 74 and echo canceller 79 may be realized during these changes, while maintaining convergence of these components. Accordingly, no retraining is needed when operating conditions change. Note that first and second gain stages 72 and 78 may be in implemented as multipliers in the digital part of digital receiver 70, enabling changing of their gain quickly. Also, separation of digital gain in first gain stage 72 from the analog gain in AGC stage 60 enables setting the AGC to optimize the dynamic range of an analog-to-digital (A/D) converter (not shown in FIG. 1), which couples the analog part to the digital part.

Referring now to FIG. 2, shown is a flow diagram of a method of maintaining convergence during power back-off (PBO) level changes initiated by a local receiver. Note that method 100 of FIG. 2 is with respect to a receiver of such changed PBO signals, i.e., acting in master mode with respect to the remote transmitter. That is, this receiver is aware of the timing of the PBO changes occurring in both near and far ends. As shown in FIG. 2, method 100 may begin by receiving a signal from a remote transmitter with a change in K_rtx due to a power back off change at the transmitter (block 110). To maintain convergence, the local transceiver may adjust both K_lrx and K_lec to maintain constant values for several gain factors. Namely, K_lrx may be adjusted to maintain a constant value for the product of K_rtx and K_lrx, and K_lec may be adjusted to maintain a constant value for the product of K_lrx and K_lec. Such values need not be exactly constant, and instead may be substantially constant, in many implementations.

Referring still to FIG. 2, as a result of these changes the local transceiver may adjust the gain of the incoming signal in its AGC stage. Accordingly, K_lrx may be adjusted to maintain a constant value for a product of K_lrx and the AGC value (block 130).

Referring still to FIG. 2, during the power back-off protocol, next the local transmitter PBO level may change. As a result, K_lec may be adjusted to maintain a constant value for a relationship between the gains of the local equalizer and the local transmitter (i.e., a product of K_lec and K_ltx) (block 140). Finally, to maintain convergence during the completion of level changes to a PBO sequence, the AGC stage may again be adjusted. Accordingly, K_lrx may be adjusted yet again to maintain a constant value for the product of K_lrx and the AGC value (block 150).

While shown with this particular implementation in the embodiment of FIG. 2, the scope of the present invention is not limited in this regard. For example, the ordering of these operations may differ depending on whether the local receiver is operating in slave mode or master mode. Instead, blocks 140 and 150 may occur prior to blocks 110, 120 and 130 in slave mode. Furthermore, it may be possible to slowly drift K_lrx and K_lec to a unity gain in a slow enough manner to allow equalizer 74 and echo canceller 79 to seamlessly track changes. In this way, any penalty of quantization errors when using gains larger than one may be avoided.

Figure 3:
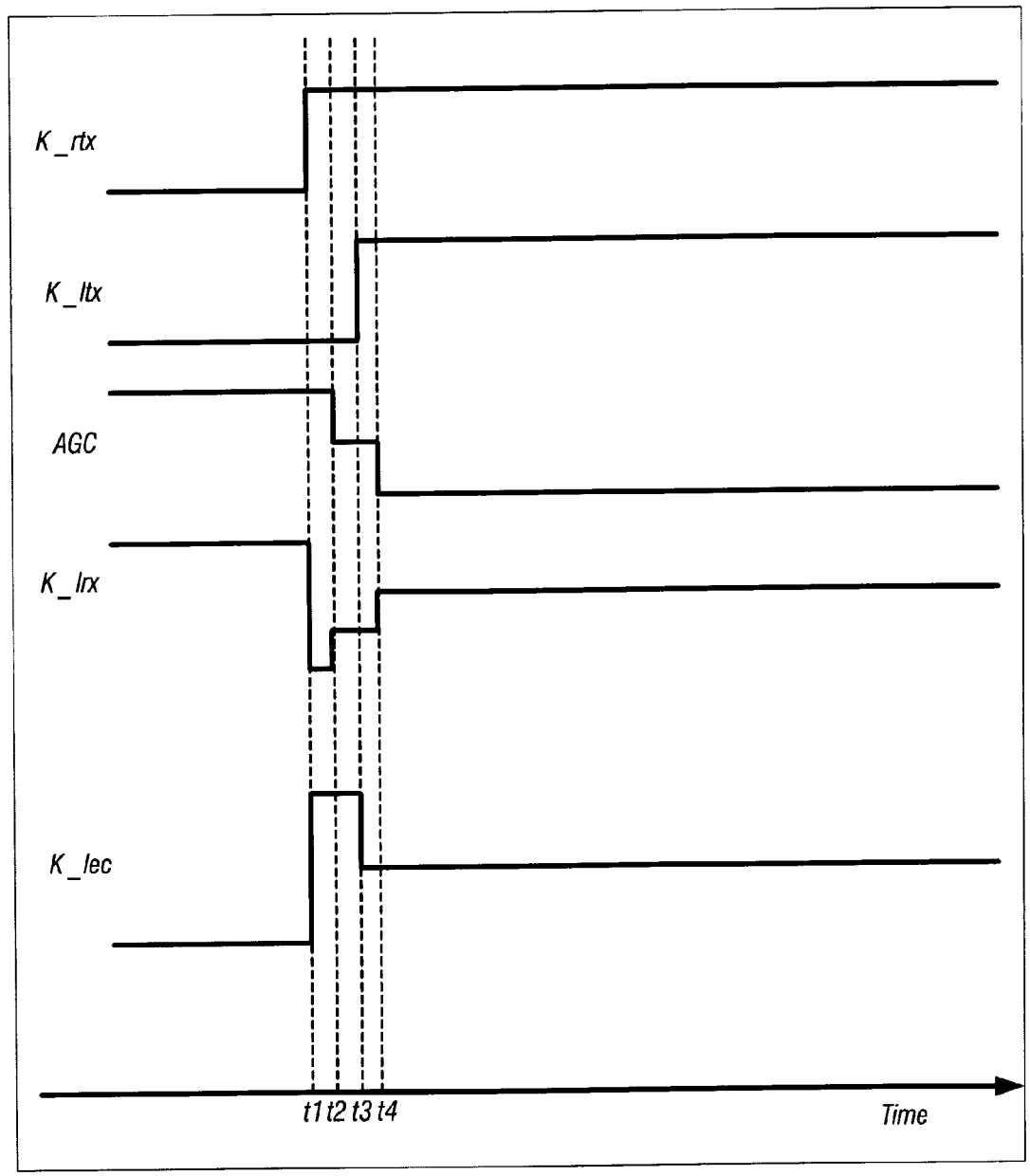
FIG. 3 is a timing diagram of operation in accordance with an embodiment of the present invention.

Referring now to FIG. 3, shown is a timing diagram of operation in accordance with an embodiment of the present invention. As shown in FIG. 3, at time t1 the remote transmit PBO level changes, resulting in a change in gain (K_rtx) of the remote transmitted signal, which in turn causes a received signal gain change. The exact change and its occurrence instance are known to the local receiver. At this instance, the local receiver's equalizer has converged, and thus by compensating for the change in the received signal gain by adjusting K_lrx such that a first predetermined product, K_rtx times K_lrx, remains constant before and after t1, the equalizer remains converged, since it receives a signal without a change in gain.

As a result of K_lrx changing, and since the echo canceller has already converged, the echo canceller output may also be compensated for the change in the echo signal's amplification. Accordingly, the gain of the equalizer path, K_lec, may be adjusted such that a second predetermined product, K_lrx times K_lec, remains constant.

Still referring to FIG. 3, at time t2 the AGC gain changes as a response to the received signal gain change. This results in an additional change in gain of the received signal gain, K_lrx. The exact change and its occurrence instance are known to the local receiver (since it issues the commands to the AGC). At this instance, the local receiver's equalizer has already converged. By compensating for the change in the received signal gain, K_lrx, that a third predetermined product, AGC times K_lrx, remains constant before and after t2. In this way, the equalizer remains converged, since it sees a received signal without a change in gain. Note that at this time, the echo signal's amplification does not change, and thus there is no need to adjust K_lec. Note that in some embodiments, the required AGC adjustment may be precomputed and adjusted exactly at t1, thus reducing the number of adjustments of K_lrx.

Referring still to FIG. 3, at time t3 the local transmit PBO level changes, resulting in a change in gain of the local transmitted signal, and thus the received echo signal gain changes. The exact change and its occurrence instance are known to the local receiver (since it is performed locally). Convergence of the echo canceller may be maintained by adjusting K_lec such that the first predetermined product, i.e., K_rtx×K_lec, is constant.

At time t4, the local AGC gain changes as a response to the total received signal gain (i.e., remote and echo) which has changed. This results in a change in gain of the received signal. The exact change and its occurrence instance are known to the local receiver (since it issues the commands to the AGC). The equalizer's convergence may be maintained by compensating for the change in the received signal gain in such a way that the third predetermined product, AGC times K_lrx, remains constant before and after time t4. Note that the echo signal's amplification does not change, and thus there is no need to adjust K_lec. While shown with this particular timing implementation in the embodiment of FIG. 3, other implementations are possible.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
an automatic gain control (AGC) stage to receive an input signal from a communication channel physical medium and to provide a compensated input signal to a digital receiver during a power back off process of a communication protocol, the digital receiver including:
a first local gain stage coupled to an output of the AGC stage;
an equalizer coupled to an output of the first local gain stage;
a summer having a first input coupled to an output of the equalizer and a second input;
an echo canceller to receive local data transmitted along the communication channel physical medium to a remote receiver; and
a second local gain stage coupled to an output of the echo canceller and having a gain of the echo canceller, an output of the second local gain stage coupled to the second input of the summer;
wherein the equalizer and the echo canceller are to remain converged during the power back off process.

2. The apparatus of claim 1, further comprising:
a local transmitter coupled to receive the local transmitted data; and
a third local gain stage coupled to an output of the local transmitter.

3. The apparatus of claim 2, wherein a gain of the first local gain stage and the second local gain stage are to be adjusted to compensate for changes in a remote gain stage of a remote transmitter coupled to the communication channel physical medium and the AGC stage during a startup process of a communication protocol.

4. The apparatus of claim 3, wherein the equalizer and the echo canceller are to remain converged during the startup process.

5. The apparatus of claim 3, wherein the gain of the first local gain stage is to be adjusted to maintain a substantially constant value for a product of the first local gain stage and the remote gain stage.

6. The apparatus of claim 5, wherein the gain of the second local gain stage is to be adjusted to maintain a constant value for a product of the first local gain stage and the second local gain stage.

7. The apparatus of claim 3, wherein the gain of the first local gain stage is to be adjusted to maintain a constant value for a product of the first local gain stage and the AGC stage upon a change to the AGC stage.

8. The apparatus of claim 7, wherein the gain of the second local gain stage is to be adjusted to maintain a constant value for a product of the second local gain stage and the third local gain stage upon a power backoff change of the apparatus.

9. The apparatus of claim 1, wherein the first and second local gain stages comprise digital gain stages.

10. A method comprising:
automatically adjusting a first gain by a first local gain stage coupled to an input of an equalizer of a receiver coupled to a communication channel physical medium and automatically adjusting a second gain by a second local gain stage having a third gain of an echo canceller of the receiver and coupled to an output of the echo canceller to compensate for a change in at least one of a remote gain stage of a transmitter coupled to the communication channel physical medium and an automatic gain control (AGC) stage of the receiver coupled to provide a compensated input signal to the first local gain stage during a power back off process of a communication protocol, wherein the equalizer and the echo canceller are to remain converged during the power back off process.

11. The method of claim 10, further comprising adjusting the first gain by the first local gain stage to maintain a constant value for a product of the first local gain stage and the remote gain stage.

12. The method of claim 11, further comprising adjusting the second gain by the second local gain stage to maintain a constant value for a product of the first local gain stage and the second local gain stage.

13. The method of claim 10, further comprising adjusting the first gain by the first local gain stage to maintain a constant value for a product of the first local gain stage and the AGC stage upon a change to the AGC stage.

14. The method of claim 13, further comprising adjusting the second gain by the second local gain stage to maintain a constant value for a product of the second local gain stage and the third local gain stage upon a power backoff change of the receiver.

15. The method of claim 10, further comprising adjusting the gains of the first and second local gain stages to drift to a unitary gain.

16. The apparatus of claim 1, wherein the summer has an output coupled to a slicer.

17. A method comprising:
automatically adjusting a first gain by a first local gain stage coupled to an input of an equalizer of a receiver coupled to a communication channel physical medium and automatically adjusting a second gain by a second local gain stage having a third gain of an echo canceller of the receiver and coupled to an output of the echo canceller to compensate for a change in at least one of a remote gain stage of a transmitter coupled to the communication channel physical medium and an automatic gain control (AGC) stage of the receiver coupled to provide a compensated input signal to the first local gain stage during a power back off process of a communication protocol, the output of the second gain stage coupled to a second input of a summer, the summer having a first input coupled to an output of the equalizer, wherein the equalizer and the echo canceller are to remain converged during the power back off process.

18. The method of claim 17, further comprising providing an output of the summer to a slicer.

19. The method of claim 17, further comprising adjusting the first gain by the first local gain stage to maintain a substantially constant value for a product of the first local gain stage and the remote gain stage.

20. The method of claim 17, further comprising adjusting the second gain by the second local gain stage to maintain a constant value for a product of the first local gain stage and the second local gain stage.

21. The method of claim 17, further comprising adjusting the first gain by the first local gain stage to maintain a constant value for a product of the first local gain stage and the AGC stage upon a change to the AGC stage.

* * * * *